Dec. 11, 1962  T. KOSA ET AL  3,067,959
MULTISTAGE TURBO-GRINDER WITH CHOKE RINGS IN EACH STAGE
Filed May 2, 1960  4 Sheets-Sheet 1

INVENTORS
TIBOR KOSA
BY TIBOR A. ROZSA
ROBERT O. HOLMES

Moore, White & Bund
ATTORNEYS

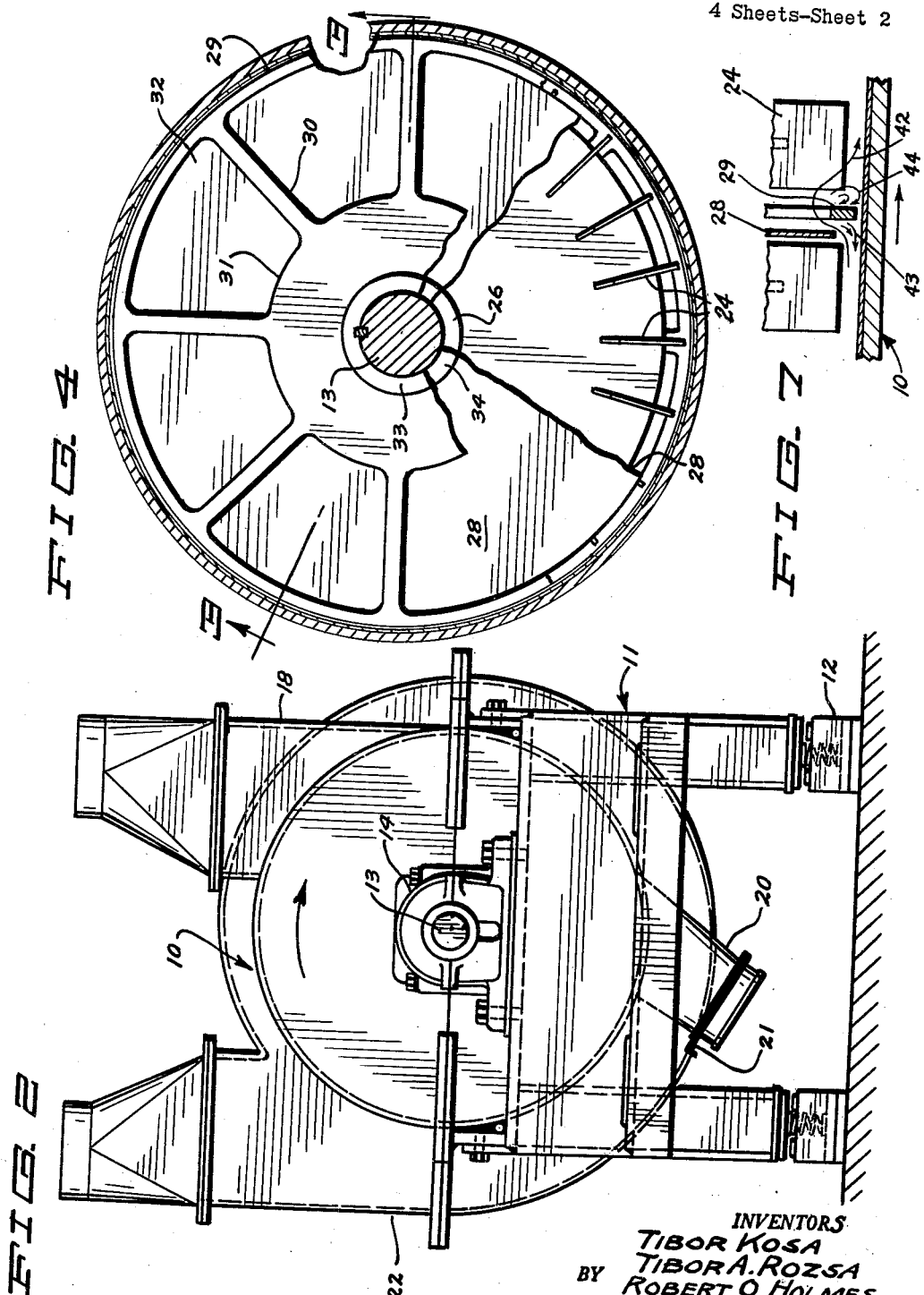

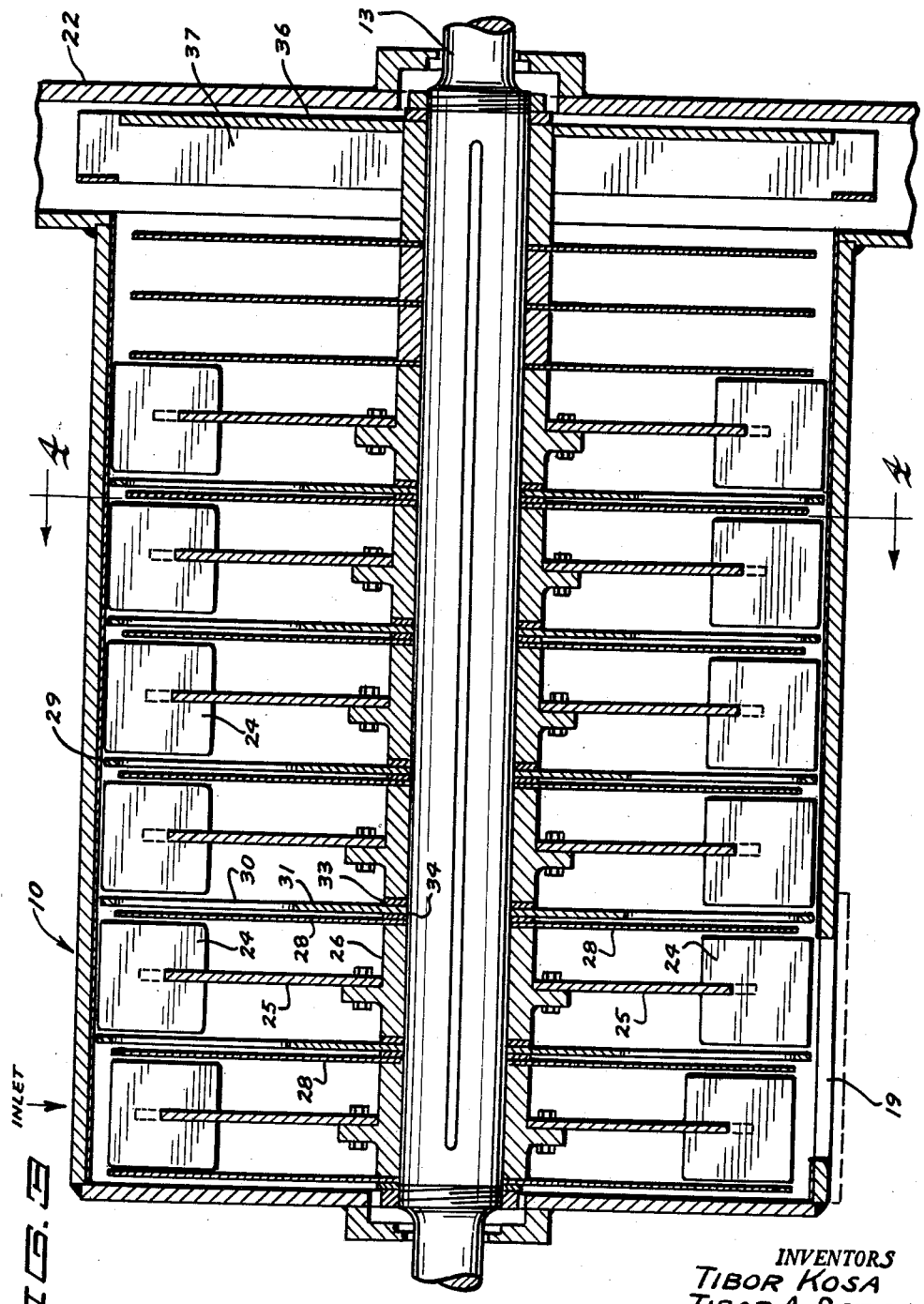

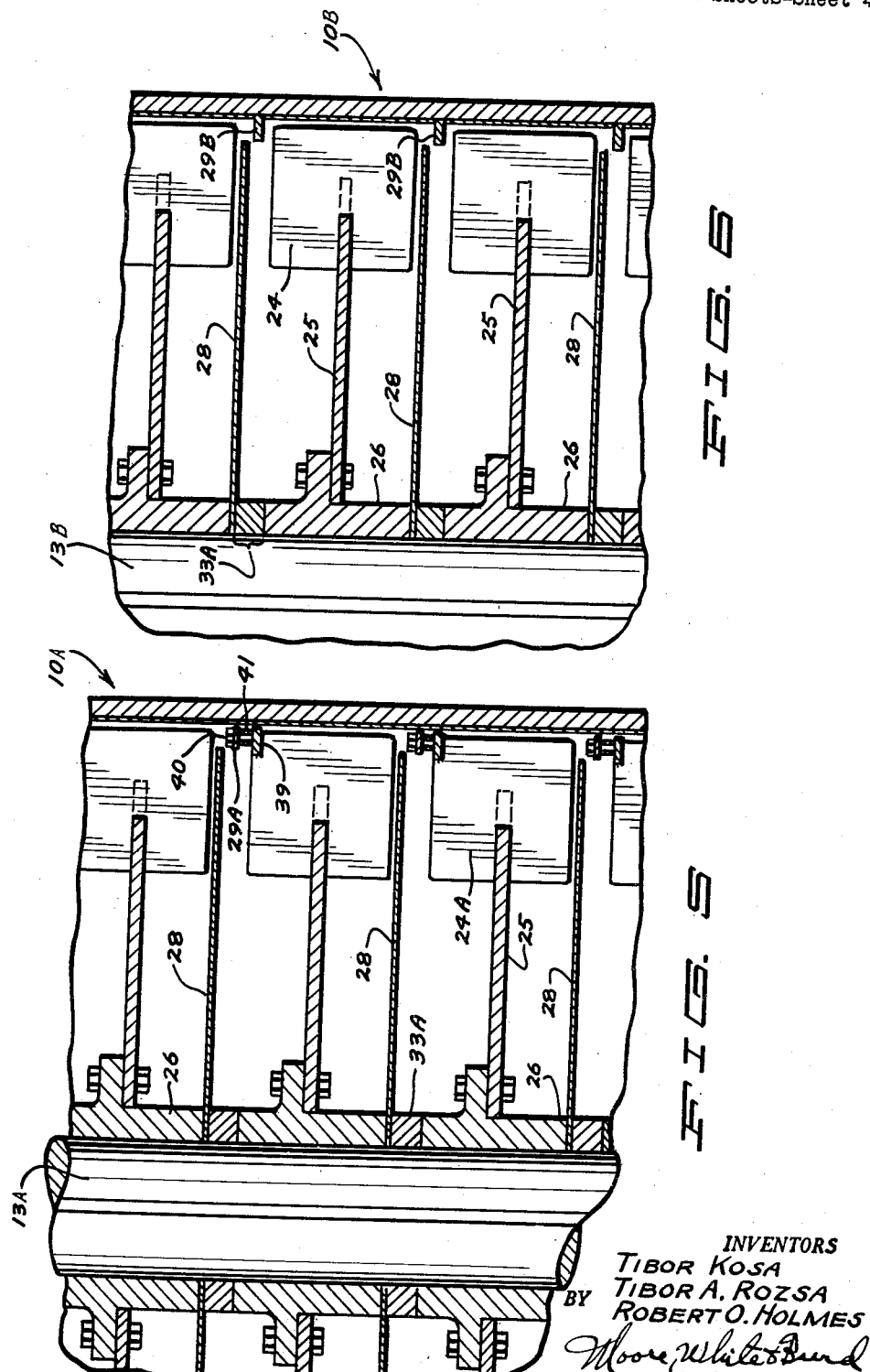

United States Patent Office 3,067,959
Patented Dec. 11, 1962

3,067,959
MULTISTAGE TURBO-GRINDER WITH CHOKE
RINGS IN EACH STAGE
Tibor Kosa, Tibor Alexander Rozsa, and Robert Olof Holmes, Minneapolis, Minn., assignors to The Microcyclomat Co., Minneapolis, Minn., a corporation of Delaware
Filed May 2, 1960, Ser. No. 26,153
14 Claims. (Cl. 241—189)

This invention relates to the art of fine grinding. More particularly this invention relates to improved means for reducing grains, seeds or parts of them such as grits, flour, bran, gums, resins, dyes, catalytic material, cocoa, filter aids and a wide variety of other granular and crystalline materials to specified particle sizes and finer.

The present invention relates to grinders or pulverizing machines of the type in which the material to be reduced is suspended in a gaseous medium, such as air, and subjected to the effects of a rotor made up of a plurality of rotor reducing units, each including a plurality of radial blades disposed between discs which are perpendicular to the axis of the rotor. Rotation of the rotor induces forces which act upon the flow of material suspended in a gaseous fluid and causes reduction by attrition of particles of material upon each other, erosion of the particles by high speed currents of moving gas, impact of particles with apparatus elements, etc., all as is understood in the art. Exemplary of such reducing apparatus are the structures illustrated and described in Lykken-Lykken Patent No. 2,440,285, Lykken-Rozsa Patent No. 2,762,572, Lykken-Rozsa-Gracza application Serial No. 440,432, filed June 30, 1954, and issued December 6, 1960, as Patent No. 2,963,230, and others.

The present invention relates to annular choking structure added to the individual closed end reducing rotor units of the type described, on the upstream side toward the feed inlet, for the purpose of altering the flow of material dispersed in gas in its passage from one rotor reducing unit to the next. The choking effect is obtained by the positioning of a narrow ring adjacent the periphery of the reducing rotor at the entrance side of each rotor unit. The ring may be stationary, mounted on the inside of the rotor housing wall, but preferably is mounted on the rotor shaft to rotate with the reducing rotor. The choking means has the effect of disrupting flow of material along the housing wall at the periphery of the reducing rotor and diverting at least part of the flow into the interior of the next succeeding reducing rotor unit.

The choking means performs a preliminary classifying function. The larger and coarser particles are retained in the preceding rotor stage and the smaller and finer particles are passed to the next succeeding rotor stage. Although the preliminary classification performed by each choking means is not precise it is repeated several times as the material enters each of the downstream reducing rotor units and cumulatively produces a desirable result. Measurably greater efficiency is obtained through the use of the choking means. This efficiency appears in the form of greater reduction of the material, lower power consumption and greater capacity.

The principal object of this invention is to provide gas attrition reducing apparatus characterized by the presence of choking means adjacent the periphery of the reducing rotor at the entrance side of the reducing rotor units or stages.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 2 is a left end elevation on a slightly enlarged scale of the turbo-grinder of FIGURE 1, shown with the motor and coupling removed for clarity;

FIGURE 3 is a vertical section through the reducing rotor portion of the turbo-grinder of FIGURE 1, showing the reducing rotor structure with one form of choke ring;

FIGURE 4 is a vertical section taken on the line 4—4 of FIGURE 3 and in the direction of the arrows, shown with parts broken away to expose the underlying structure;

FIGURE 5 is a fragmentary vertical section similar to FIGURE 3 through a turbo-grinder unit which may be disposed on either a vertical or horizontal axis and showing an alternative method of mounting a choke ring;

FIGURE 6 is a further fragmentary vertical section showing still another method of mounting a choke ring; and FIGURE 7 is a fragmentary vertical section similar to FIGURE 3 but on an enlarged scale and showing diagrammatically the eddy gas currents produced in the vicinity of one choke ring.

Figure 1:
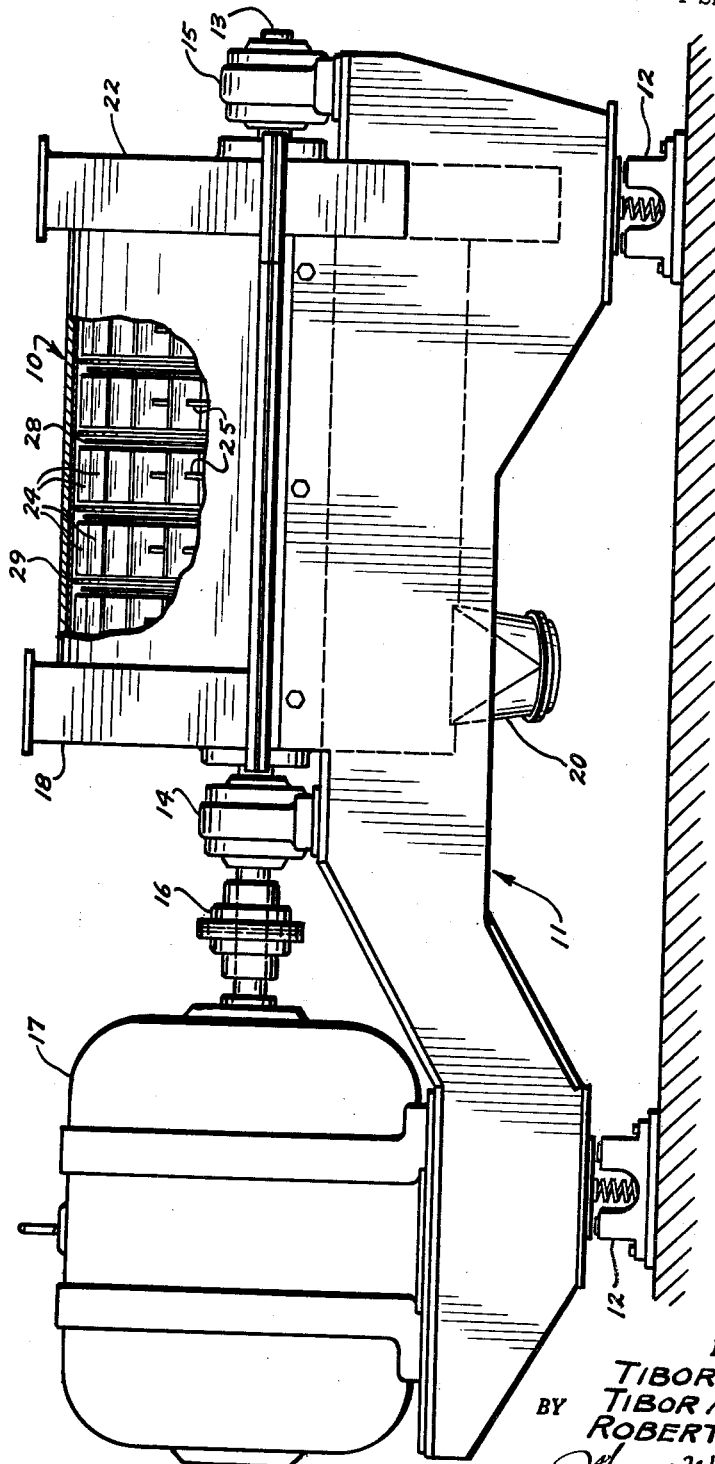
FIGURE 1 is a side elevation of one form of horizontal axis turbo-grinder embodying the present invention.

Referring to the drawings and particularly to FIGURES 1 through 4, there is shown a horizontal axis turbo-grinder whose housing is indicated generally at 10 and which is supported in a base structure indicated generally at 11. The supporting base in turn is desirably supported from the floor through vibro-insulators 12. As is well known in the art the housing 10 is generally cylindrical in shape and is formed in flanged semi-cylindrical halves for easy assembly and disassembly. The lower semi-cylindrical half of the housing is cradled in the supporting base and secured by suitable fastening means. The housing is preferably provided with a liner and desirably with a spirally corrugated liner.

A shaft 13 extends axially through the housing 10 and is journalled in bearings 14 and 15 mounted on the supporting base 11 outside the opposite ends of the housing. Shaft 13 is connected by suitable coupling means 16 to the drive shaft of motor means, such as electric motor 17.

The housing is provided at one end with a tangential material inlet 18 through which material to be reduced is fed to the reducing rotor. The housing is provided with an opening 19 underlying the inlet end of the housing and communicating with a duct 20 which functions as a trap to receive any grit or sand or tramp metal or other dense and heavy material which may possibly contaminate the material to be reduced. A slide damper 21 permits the operator to control the discharge of coarse and dense material from the duct 20. A scroll housing 22 at the end opposite from the material inlet serves as a product discharge from the turbo-grinder.

Referring now more particularly to FIGURES 3 and 4, wherein the reducing rotor structure is shown, it will be seen that the reducing rotor comprises a plurality of units or stages each including a plurality of radial blades mounted for rotation with the shaft. These reducing rotor units are referred to as "closed end" units since each is positioned between a pair of solid discs. Each reducing rotor unit includes a plurality of flat slotted radial blades 24 fitted into and carried by a slotted disc 25 which in turn is secured to a flanged collar 26 keyed to shaft 13 for rotation therewith. Each reducing rotor unit is contained between a pair of solid annular discs 28 mounted on the rotor shaft.

Heretofore it has been the usual practice to have each reducing rotor unit closely spaced between the pairs of solid discs, as shown by the first reducing rotor unit at the left or inlet end of the housing as shown in FIGURE 3. The present invention resides in the modification of this usual structure, as illustrated by each of the remaining reducing rotor units, as shown in FIGURE 3. The modification consists of the positioning of a relatively narrow annular ring 29 between the upstream edge of radial blade 24 and solid disc 28 on the entrance side of each reducing rotor unit; that is, the side of each reducing unit toward the feed inlet.

Choke ring 29 is supported at the ends of spokes 30 radiating outwardly from a hub 31 which is keyed to shaft 13. Preferably ring 29, spokes 30 and hub 31 are integrally formed. A plurality of relatively wide openings 32 exist in the space between the outer periphery of hub 31, the inner periphery of ring 29 and spokes 30. Choke ring 29 is held spaced from the upstream edge of radial blade 24 by means of a spacer ring 33 around shaft 13 between hub 31 and collar 26. Choke ring 29 is held spaced from solid disc 28 by means of a spacer ring 34 around shaft 13 between hub 31 and the portion of disc 28 surrounding the shaft. Each of the reducing rotor units, except that immediately adjacent to the feed inlet, has the same structure including the presence of a choke ring 29 at the entrance side of the rotor unit. The choking structure is installed between each adjacent pair of rotor stages of decks.

A fan, including an annular fan plate 36 carrying a plurality of radiating fan blades 37, is mounted on shaft 13 for rotation in the scroll housing 22 to assist in the discharge of the reduced material from the grinder housing. The space between the last reducing rotor unit and the fan is occupied by a pair of extra solid discs 28. These discs function primarily to fill up the space to prevent accumulation of material therein by narrowing the annular space for passage of gas and create high enough horizontal component to transport the solids. The same space may, if desired, be occupied by a further reducing rotor unit fitted with a choke ring.

As shown in FIGURE 3, the outside diameter of choke ring 29 is such as to just provide running clearance within the housing. The inside diameter of choke ring 29 is about equal to the outside diameter of the solid discs 28 separating the individual reducing rotor units. By virtue of the spacing provided by spacer ring 34 there is a narrow annular aperture between the inside edge of ring 29 and the outside edge of disc 28. That aperture serves as a port through which the material particles must pass to get from one reducing stage to the next in the course of its passage through the grinder apparatus.

It has been determined experimentally that the normal expected flow longitudinally in the space between the outer periphery of the reducing rotor and the inside housing wall does not occur. This is true even though running clearance space exists through which flow of material might be expected. Instead it has been found that the normally axial flow from one reducing stage to the next is diverted inwardly toward the aperture between the outer edge of disc 28 and the inner edge of choke ring 29. This aperture being restricted passes only the finer particles. The coarser particles are turned back in an eddy flow (as shown schematically at 43 in FIGURE 7) toward the reducing stage they have just left and enter the circulating flow in and around that reducing stage for further reduction before passage to the next successive stage.

This procedure is repeated between each successive pair of reducing rotor units. Since the larger particles are retained to undergo further reduction before passage to the next succeeding rotor stage, greater overall reduction of the material is achieved. At the same time fewer grinding rotor units and less power is required and a grinder has greater capacity than a corresponding grinder of like size without the inner choke rings. In one comparative test a four unit rotor equipped with choke rings reduced as much material as a seven unit rotor of the same size without the rings while reducing the material to greater fineness with less horsepower consumption.

Referring now to FIGURE 5, there is here shown an alternative method of mounting an inner choke ring. In this form of construction disc 28 is spaced from the upstream edge of the blade of the next succeeding reducing rotor unit by means of a somewhat wider spacer 33A. An annular inner choke ring 29A is mounted in the space between the disc and the blade edge. A lug 39 is secured to each of several blades of each rotor stage on the upstream or inlet side. The ring 29A is secured to the lug by means of a bolt 40 and is held spaced from the blade 24A by means of a spacer collar 41. The alternative form of choke ring functions in all material respects identically with that described in connection with FIGURES 3 and 4. Only the method of mounting is different and the alternative method of mounting is less preferred. Shaft 13A and housing 10A may be disposed on either a horizontal or vertical axis.

Referring to FIGURE 6 there is shown still another form of choke ring. In this construction, disc 28 is held spaced from the edge of radial blade 24 by means of a wide spacer 33A. The choke ring 29B is disposed in this space. The choke ring 29B in this instance is stationary and is secured by suitable fastening means to the inside surface of the housing wall. Although the operation of the grinder containing stationary choke rings is generally similar to that of grinders having rotating choke rings it has been found that the stationary ring is somewhat less effective. The friction of the rotating choke rings helps to maintain the angular vortex velocity of the fluid and solid material mixture and helps to maintain the centrifugal component force in the zone of centripetal air drag along the face of the rotating choke ring. The spokes of the preferred ring design further help to maintain the angular velocity of the vortex during classification. For practical reasons the use of stationary choke rings is limited to horizontal axis grinders whose housings are built to be separated into two semi-cylindrical halves for removal of the rotor. Shaft 13B and housing 10B may be disposed on either a horizontal or vertical axis.

In the operation of the turbo-grinder apparatus according to the present invention, the rotor is driven at relatively high speed, such as, for example, about 3600 r.p.m. for a 26 inch rotor. Dry material to be reduced is fed into the housing 10 through tangential feed inlet 18. Air or other gas is introduced along with the material. As is understood in the art, the dry material suspended in air is circulated about the reducing rotor and at the same time is subjected to vortex actions between the radial blades of the reducing rotor units induced by the rotation of the rotor.

Reduced pressure exists at the discharge end of the housing because of the action of fan blades 37 or an outside suction source, or both. This zone of reduced pressure draws the material through the grinding apparatus, generally in the direction from the feed inlet to the discharge from scroll housing 22. Normally, this flow takes place around the outer periphery of the reducing rotor adjacent the cylindrical housing wall. In the present apparatus, however, quite unexpectedly, the flow pattern from one reducing rotor stage to the next is changed. Instead of flowing along the housing wall, the flow is diverted inwardly.

As shown in FIGURE 7, with the direction of flow as indicated, the finer part of the material flows through the space between the outer edge of disc 28 and the inner edge of ring 29 following generally the path of arrow 42. That part of the flow containing the coarser particles is reversed and directed backwardly along the inside housing wall to the preceding reducing rotor unit for further reduction as shown generally by the path of arrows 43. This interruption of the material flow occurs between each of the pairs of reducing rotor units. Further turbulence and eddy currents are created as shown generally by the path of arrows 44 to further assist in retaining coarser particles in the rotor for further reduction. From the last reducing rotor unit the material passes to the fan in the discharge housing and is expelled through the grinder to a classifier or an air separator or a further reducing apparatus or the like, depending upon the particular material reduced and its intended use.

It has been determined that for commercial grinders having rotor diameters of about 24 to 36 inches, the inner choke ring 29 may have a face width of between about ⅜ of an inch and one inch. A face width of about one-half inch has been found to be optimum for most commercial grinders. The choke ring may have a thickness of between about ⅛ and ⅝ of an inch and preferably for commercial grinders is about ¼ inch in thickness. The choke ring may be spaced between about ⅛ and ⅜ of an inch from the adjacent solid disc 28 and adjacent radial blades 24 but preferably this spacing is about ¼ inch. The inside diameter of ring 29 is preferably about the same as the outside diameter of adjacent disc 28. As the space between the outer edge of the disc and the inner edge of the ring becomes larger less choking effect is achieved with lesser increase in efficiency of operation. On the other hand if the disc and inner ring overlap substantially, too much choking is effected and grinder capacity is materially reduced.

Although the choke ring improvement of the present invention has been described with particular reference to horizontal axis grinding apparatus it is equally adapted for use in vertical axis grinding machines. This is true whether the flow of material is from top to bottom as in the apparatus of the aforementioned Patent No. 2,762,572 or from bottom to top as in the apparatus of the aforementioned application, Ser. No. 440,432. In either instance the choking means are installed between each pair of reducing rotor units on the upstream or entrance side of the reducing rotor unit. Where the flow of material is from top to bottom the choke rings are installed in the top portion of the annular reducing rotor units. Where the flow of material is from bottom to top the choke ring is installed in the bottom portion of the rotor units.

It is apparent that many modifications and variations of this invention as hereinbefore set forth may be made without departing from the spirit and scope thereof. The specific embodiments described are given by way of example only and the invention is limited only by the terms of the appended claims.

What is claimed is:

1. A gas attrition reducing apparatus for reducing dry solid material comprising a generally cylindrical housing; a material and gas feed inlet adjacent one end of said housing; a reduced product discharge adjacent the opposite end of said housing; a reducing rotor journalled for rotation within said housing; said rotor comprising a shaft substantially co-axial with said housing; a plurality of closed end reducing rotor units mounted on said shaft for rotation therewith; each of said reducing rotor units including a plurality of like radial blades disposed uniformly about the shaft, each of said blades lying in a plane with the axis of the shaft and the outer edges of said blades lying at the periphery of the rotor; running clearance between the periphery of said rotor and the inside wall of said housing; annular discs enclosing each of said reducing rotor units, said discs being mounted for rotation with said shaft, each of said discs between adjacent pairs of reducing rotor units being positioned closely adjacent the radial downstream end edges of the rotor blades of one reducing rotor unit of said pair and spaced from the upstream end edges of the blades of the other rotor unit of that pair; and a narrow annular ring positioned in the space between the disc and the rotor blades, said ring being positioned at the periphery of the rotor and spaced from both the disc and the blades.

2. An apparatus according to claim 1 further characterized in that said annular ring is mounted for rotation with said rotor.

3. An apparatus according to claim 2 further characterized in that said annular ring is supported at the periphery of said rotor by spokes extending outwardly from said shaft.

4. An apparatus according to claim 1 further characterized in that the outside diameter of said annular ring is substantially the same as the outside diameter of said rotor as measured between the outside edges of said rotor blades and the inside diameter of said annular ring is substantially the same as the outside diameter of the adjacent annular disc.

5. An apparatus according to claim 1 further characterized in that said annular ring has a face width of between about ⅜ of an inch and 1 inch, and a thickness between about ⅛ and ⅝ of an inch, and is spaced between about ⅛ and ⅜ of an inch from the adjacent disc and blade edges.

6. An apparatus according to claim 5 further characterized in that the annular ring has a face width of about ½ inch, a thickness of about ¼ inch, and is spaced bout ¼ inch from the adjacent disc and blade edges.

7. A reducing rotor adapted to be mounted in the housing of a grinding apparatus for reducing dry solid material, said rotor comprising a shaft; a plurality of closed end reducing rotor units mounted on said shaft for rotation therewith; each of said reducing rotor units including a plurality of like radial blades disposed uniformly about the shaft, each of said blades lying in a plane with the axis of the shaft and the outer edges of said blades lying at the periphery of the rotor; a pair of annular discs positioned at opposite ends of said radial blades enclosing each of said reducing rotor units, said discs being mounted for rotation with said shaft, each of said discs between adjacent pairs of reducing rotor units being positioned closely adjacent the radial end edges of the rotor blades of one reducing rotor unit of said pair and spaced from the end edges of the blades of the other rotor unit of that pair; and a narrow annular ring positioned in the space between the disc and rotor blades, said ring being positioned at the periphery of the rotor and spaced from both the disc and blades.

8. A reducing rotor according to claim 7 further characterized in that said annular ring is mounted for rotation with said rotor.

9. A reducing rotor according to claim 8 further characterized in that said annular ring is supported at the periphery of said rotor by spokes extending outwardly from said shaft.

10. A reducing rotor according to claim 7 further characterized in that the outside diameter of said annular ring is substantially the same as the outside diameter of said rotor as measured between the outside edges of said rotor blades and the inside diameter of said annular ring is substantially the same as the outside diameter of the adjacent annular disc.

11. A reducing rotor according to claim 7 further characterized in that said annular ring has a face width of between about ⅜ of an inch and one inch, and a thickness between about ⅛ and ⅝ of an inch, and is spaced between about ⅛ and ⅜ of an inch from the adjacent disc and blade edges.

12. A reducing rotor according to claim 11 further characterized in that the annular ring has a face width of about ½ inch, a thickness of about ¼ inch, and is spaced about ¼ inch from the adjacent disc and blade edges.

13. A reducing apparatus comprising a generally cylindrical housing; a material and gas inlet at one end of said housing; a product discharge from the opposite end of said housing; a reducing rotor journalled for rotation within said housing; said rotor comprising a shaft; a plurality of closed end reducing rotor units mounted on said shaft; each of said reducing rotor units including a plurality of radial blades disposed about the shaft, the outer edges of said blades lying at the periphery of the rotor; each of said reducing rotor units being held between a pair of annular discs, each of said discs between adjacent pairs of reducing rotor units being positioned closely adjacent the radial end edges of the rotor blades of one reducing rotor unit of said pair and spaced from the end edges of the blades of the other rotor unit of that pair; and a narrow annular ring positioned in the space between the disc and rotor blades, said ring being positioned at the periphery of the rotor and spaced from both the disc and blades.

14. A reducing rotor comprising a shaft; a plurality of closed end reducing rotor units mounted on said shaft; each of said reducing rotor units including a plurality of radial blades disposed about the shaft, the outer edges of said blades lying at the periphery of the rotor; each of said reducing rotor units being held between a pair of annular discs, each of said discs between adjacent pairs of reducing rotor units being positioned closely adjacent the radial end edges of the rotor blades of one reducing rotor unit of said pair and spaced from the end edges of the blades of the other rotor units of that pair; and a narrow annular ring positioned in the space between the disc and rotor blades, said ring being positioned at the periphery of the rotor and spaced from both the disc and blades.

References Cited in the file of this patent

UNITED STATES PATENTS

| | | |
|---|---|---|
| 587,501 | Day | Aug. 3, 1897 |
| 1,621,571 | Witz | Mar. 22, 1927 |